(12) United States Patent
Leppänen

(10) Patent No.: US 6,418,206 B1
(45) Date of Patent: *Jul. 9, 2002

(54) PROCEDURE AND SYSTEM FOR THE SETTING UP OF CALLS

(75) Inventor: Osmo Leppänen, Lahti (FI)

(73) Assignee: Sonera Oyj, Helsinki (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 32 days.

(21) Appl. No.: 09/077,969

(22) PCT Filed: Dec. 17, 1996

(86) PCT No.: PCT/FI96/00672

§ 371 (c)(1),
(2), (4) Date: Feb. 9, 1999

(87) PCT Pub. No.: WO97/23081

PCT Pub. Date: Jun. 26, 1997

(30) Foreign Application Priority Data

Dec. 20, 1995 (FI) ............................................. 950534 U

(51) Int. Cl.$^7$ .......................... H04M 15/00; H04M 3/42
(52) U.S. Cl. .............................. 379/114.01; 379/114.03; 379/114.05; 379/114.27; 379/201.02; 379/114.28
(58) Field of Search ................................ 379/202, 211, 379/111, 112, 114, 121, 201, 206, 207, 216, 221, 112.01, 114.01, 114.02, 114.03, 114.05, 114.21, 114.22, 114.27, 114.28, 121.02, 201.01, 201.02, 211.02, 212.01, 216.01, 220.01, 221.06, 221.08

(56) References Cited

U.S. PATENT DOCUMENTS 5,216,703 A * 6/1993 Roy ............................ 379/59
5,325,421 A * 6/1994 Hou et al. ................... 379/67

(List continued on next page.)

FOREIGN PATENT DOCUMENTS

| FI | 2405 | * 4/1996 |
| WO | 93/25035 | 12/1993 |

(List continued on next page.)

OTHER PUBLICATIONS

"Europuhelin", *Lehti Radiolinjalta Europuhelimen Käyttäjille* 1/94.

(List continued on next page.)

*Primary Examiner*—Curtis Kuntz
*Assistant Examiner*—Quoc Tran
(74) *Attorney, Agent, or Firm*—Nath & Associates PLLC; Gary M. Nath; Marvin C. Berkowitz

(57) ABSTRACT

A procedure and system for setting rates between two predetermined subscriptions in a telephone network without the necessity of substantial system changes to the telephone network. Calls between two predetermined subscriptions can be rated according to a special tariff and changes can be easily and flexibly included in the normal invoicing. When the number of subscriptions per customer is limited to two, the common call number for all customers is the same, e.g. 020100. When this number is dialed, the call is directed to the wired network subscription specified in the subscriber number pair, which is stored in a database, when the call is made from a mobile station, and vice versa. When the number of subscriptions connected to the system by the customer is greater than two, the common call number comprises a prefix part which is the same for all customers and on the basis of which the telephone network exchange recognizes the service call of intelligent network calls and specially rated calls, and a suffix part which is an integer and which, via the intelligent network, determines the desired individual subscription among subscriptions selected to be included in the system by the customer.

16 Claims, 1 Drawing Sheet

U.S. PATENT DOCUMENTS

| | | | | |
|---|---|---|---|---|
| 5,325,424 A | * | 6/1994 | Grube | 379/201 |
| 5,329,578 A | * | 7/1994 | Brennan et al. | 379/67 |
| 5,369,695 A | * | 11/1994 | Chakravarti et al. | 379/211 |
| 5,377,186 A | * | 12/1994 | Wegner et al. | 370/62 |
| 5,566,229 A | * | 10/1996 | Hou et al. | 379/88 |
| 5,590,186 A | * | 12/1996 | Liao et al. | 379/210 |
| 5,592,537 A | * | 1/1997 | Moen | 379/67 |
| 5,666,405 A | * | 9/1997 | Weber | 379/127 |
| 5,668,862 A | * | 9/1997 | Bannister et al. | 379/201 |
| 5,689,555 A | * | 11/1997 | Sonnenberg | 379/220 |
| 5,793,857 A | * | 8/1998 | Barnes et al. | 379/207 |
| 5,796,813 A | * | 8/1998 | Sonnenberg | 379/220 |
| 5,854,834 A | * | 12/1998 | Gottlieb et al. | 379/113 |
| 5,864,604 A | * | 1/1999 | Moen et al. | 379/88 |

FOREIGN PATENT DOCUMENTS

| | | |
|---|---|---|
| WO | 94/05126 | 3/1994 |
| WO | 95/06381 | 3/1995 |
| WO | 95/28809 | 10/1995 |

OTHER PUBLICATIONS

"Aikaväli", *Radiolinja OY:N Kauppiaslehti*, 1/94.

Auvinen, Jari, "Alyverkkopalvelut Matkapuhelinverkoissa" thesis, Oct. 29, 1991.

Ambrosh, W., et al. (eds.), *The Intelligent Network*, Joint Study by Bell Atlantic, IBM and Siemens, 1989.

"Call International" business contacts, *Torstaina* Mar. 11, 1994.

"Pluslinjalla edulliset puhelut kotoa GSM–Europuhelimeen", *Puhelinuutisia*, Mar. 9, 1995.

"matkapuhelin–uutisia" *Telelinkki*, 1/96.

* cited by examiner

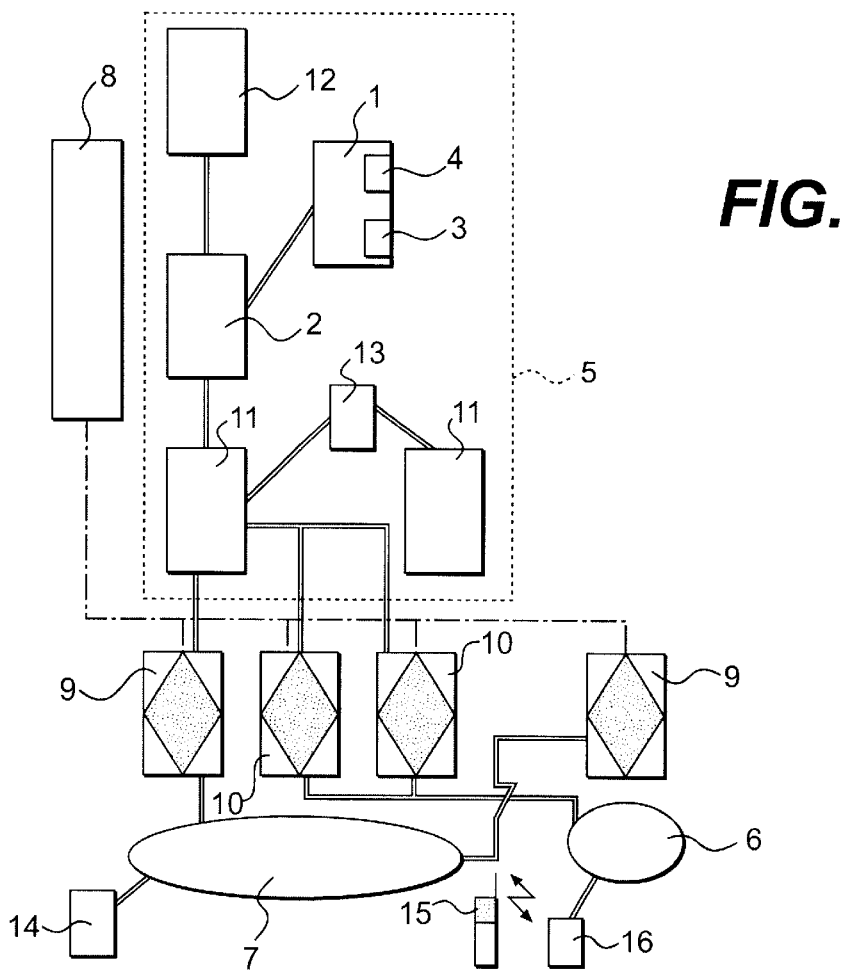
FIG. 1
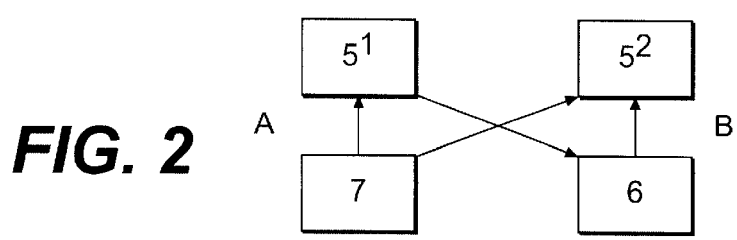
FIG. 2
| A-NUMBER | 020100 | 020101 | 020102 | 020103 | 020104 |
|----------|--------|--------|--------|--------|--------|
| 123456 | 333444 | 0 | 0 | 0 | 0 |
| 333444 | 123456 | 0 | 0 | 0 | 0 |
FIG. 3

PROCEDURE AND SYSTEM FOR THE SETTING UP OF CALLS

FIELD OF THE INVENTION

The present invention relates to a procedure and to a system for the setup of specially rated calls between two predetermined subscriptions. Moreover, the invention relates to the setting up of a specially rated call between said subscriptions.

BACKGROUND OF THE INVENTION

Call setup in a telephone network is normally based on a number selection made by a calling subscriber, in other words, a calling subscriber selects via his/her terminal equipment the subscriber number of a called subscription, on the basis of which the switchboard and exchange system of the telephone network connects the calling subscriber with the called subscriber. In the case of this kind of normal call setup, the calling subscriber pays for the calls he/she has made a price in accordance with the general tariffs valid at the time.

In the existing telephone network, a known practice is to use service numbers common to all callers, for instance the so-called free numbers starting with 9800-, 0800- or 9700-, and the chargeable service numbers staring with 0700-, 9600- or 0600-, and e.g. the short numbers used for number inquiries. However, such service numbers are not actual subscriber numbers, but the calls made to these numbers are redirected by the switchboard and exchange system of the telephone network to actual subscriber numbers behind the service numbers. When calling such a number, the calling subscriber does not know the connected subscriber's number because the number is changed and the call is redirected in the telephone network. In the call setup chain, the service number is a so-called C-number. Calls to such service numbers are usually either free or rated at a price substantially higher than normal call tariffs.

SUMMARY OF THE INVENTION

The object of the present invention is to achieve in the telephone network a new type of procedure and system for call control and to meet a need observed recently in the telecommunication business for calls especially between certain predeterminable subscriptions. A further object of the present invention is to present a procedure that allows said calls to be set up using a predetermined call number common to all subscribers, on the basis of which the calls can also be assigned a price below normal tariffs. Such calls could be e.g. calls made within a family or a small enterprise e.g. between a wired network subscription and/or an optional number of mobile subscriptions. In this case, the specially rated telephone communication would comprise calls from a specified wired network subscription to a specified number of mobile telephone subscriptions and vice versa, calls between specified mobile telephone subscriptions and also between wired network subscriptions.

A further object of the invention is to achieve a service in which the customer is able to define a pair or set of desired subscriptions between which the calls are invoiced at a price below the normal tariff.

As for the features characteristic of the present invention, reference is made to the claims.

In the procedure of the invention, a specially rated call, generally cheaper than the normal tariff, is set up between two subscriptions. According to the invention, the subscriptions are predetermined and the procedure is implemented as follows. First, a common call number differing from the subscriber number is reserved for all subscriptions. The common call number may consist of two parts and have the form ABCDER, where the prefix part ABCDE is a digit series common to all, while R is an integer in the set $[0, 1, \ldots, N)]$. Further, a subscriber number pair between two subscriber numbers is formed, between which a specially rated call is set up, and the number pair is stored by means of a storage device. The number pair can preferably be stored in a suitable database or an equivalent component in the telephone network. After this, calls to the common call number are directed to a checking device, by means of which the second subscriber number corresponding to the subscriber number of the calling subscription is determined. Finally, the call is connected to the subscription corresponding to the second subscriber number. Finally, invoicing data determined on the basis of the common call number is given to the invoicing system, so that a price preferably lower than the normal call price will be charged for the call.

The advantages of the present invention as compared with prior art include the fact that the system does not require any substantial system changes in the telephone network. In addition, calls between predetermined subscriptions can be rated according to a special tariff and the charges can be easily and flexibly included in the normal invoicing.

Moreover, the invention allows the same tariffs to be applied to calls in either direction, i.e. from a mobile station to a wired network subscription or vice versa, or, on the other hand, the price may be different depending on direction. Furthermore, the invention makes it possible to offer the customer a specially rated data connection for communication between a pair or set of computers.

In a preferred embodiment of the present invention, the pair of subscriber numbers to be considered is selected on the basis of a suffix part of a common call number. Further, subscriber numbers entitled to specially rated calls are stored in a database and the calling subscriber's right to specially rated calls is verified via reference to the database on the basis of the calling subscriber's subscriber number.

There are several alternative solutions for forming a subscriber number pair. A subscriber number pair can be established between a wired network subscription and a mobile communications network subscription. In addition, a subscriber number pair can be established between a wired network subscription and several mobile communications network subscriptions, in which case the subscriber number pair is assigned a separate common call number in which the suffix part determines the subscriber number pair to be considered so that a call made from the wired network subscription is directed on the basis of the suffix part of the common call number to the subscription corresponding to the mobile subscriber number defined in the subscriber number pair and a call made from each mobile subscriber number is directed to the subscriber number corresponding to the wired network subscriber number defined in the subscriber number pair. This makes it possible to form a kind of specially rated group in which a specially rated call can be made from a wired network subscription to several mobile network subscriptions and from each mobile subscription in the group to one and the same wired network subscription. Furthermore, it is possible to establish a subscriber number pair among a set comprising a wired network subscriber number and a plurality of mobile network subscriber numbers so that a call made form any one of the subscriber numbers to the common call number is directed on the basis of the suffix part of the common call number to the subscription corresponding to the second subscriber number corresponding to the calling subscriber number in the set of subscriber numbers. This again provides the possibility to form a kind of specially rated network comprising a number of subscriptions which can be selected either from a wired network or from a mobile communications network and between which it is possible to establish specially rated number pairs according to free selection.

Moreover, the present invention relates to a system for setting up a specially rated call between two predetermined subscriptions in a telephone network, which may comprise a mobile communications network, a wired telephone network, some other telecommunications network or a combination of these, between two subscriptions. According to the invention, the system comprises a storage device in which, in addition to the predetermined subscriber number pairs and the corresponding common call number, it is also possible to store a list of subscriber numbers entitled to specially rated calls. In addition, according to the invention, the system comprises means for receiving the subscriber number of the calling subscription in connection with the setup of a call to the common call number and for determining the second subscriber number corresponding to the calling subscriber number on the basis of the number pair data stored in the storage device. The telephone network preferably comprises an intelligent network switching centre, in which case the means for receiving the subscriber number of the calling subscription and determining the subscriber number pair corresponding to the subscriber number are disposed in the intelligent network switching centre.

In a preferred embodiment of the present invention, the storage device comprises a first database which contains the subscriber numbers entitled to specially rated calls, and a second database which contains the subscriber number pairs between which a specially rated call is to be set up when the common call number is called.

In an embodiment of the invention, the intelligent network switching centre is disposed in a mobile communications network, in which case a call to the common call number is directed to the intelligent network switching centre of the mobile communications network. On the other hand, the intelligent network switching centre may be disposed in the wired telephone network, in which case a call to the common call number is directed to the intelligent network switching centre of the wired telephone network. Moreover, the system comprises an invoicing system, which is connected to the intelligent network switching centre or some other suitable component, such as a telephone exchange.

In an embodiment of the system, one of the databases contains a number of common call numbers and the subscriber number pair corresponding to each common call number so that the first subscriber number in each subscriber number pair is the same wired network subscriber number and the second subscriber number is a mobile communications network subscriber number. Reference is here made to the above description of a specially rated group.

In another embodiment, the other database contains a number of common call numbers and the subscriber number pair corresponding to each common call number so that the first and second subscriber numbers in each subscriber number pair are selected from a set of subscriber numbers comprising a wired network subscriber number and a mobile communications network subscriber number. Reference is here made to the above description of a specially rate group.

As a summary of the above, let the following be noted. When the number of subscriptions per customer is limited to two, the common call number for all customers is the same, e.g. 020100. When this number is dialled, the call is directed to the wired network subscription specified in the subscriber number pair when the call is made from a mobile station, and vice versa. When the number of subscriptions connected to the system by a customer is greater than two, the common call number comprises a prefix part which is the same for all customers and on the basis of which the telephone network exchange recognizes the service call of intelligent network calls and specially rated calls, and a suffix part which is an integer and which, via the intelligent network, determines the desired individual subscription among the subscriptions selected to be included in the system by the customer. In this case it is preferable that the suffix part indicating the wired network subscription is 0 and the suffix part identifying other subscriptions is an integer selected from the set [0, 1, . . . , N].

A service as achieved by the procedure and system of the invention can be included in the service agreement made with the customer. The dealer selling the subscription may also open the service via his/her terminal or by calling the teleoperator's service number or customer service via an automatic apparatus recognizing tone frequency signals or via a corresponding customer server. A service ordered via a service number and an automatic apparatus is ready for use on the next weekday, provided that the order has been made from the subscription to which the service is to be added, because in this way the subscriber number or identity or A-ID of the subscription in question can be signalled. For the sake of clarity, let it be stated that an A-ID is always given in mobile communication and in the wired network when the subscription is digital. This limitation encountered in the wired network is the only restriction to the connection of the service and if the subscription pair or set desired by the customer includes such a wired network subscription which does not signal an A-ID, such a subscription can only function as a subscription receiving calls in the system of the invention. Having joined the system, a customer may change the numbers in the pair or set of subscriptions he/she has selected or cancel it by making a call to the system service number.

BRIEF DESCRIPTION OF THE DRAWINGS

In the following, the invention is described in detail by the aid of a few embodiment examples by referring to the attached drawings, in which FIG. 1 presents a diagram representing a system according to the invention, FIG. 2 presents a diagram representing a control arrangement according to the invention for directing calls to an intelligent network, and FIG. 3 represents a method according to the invention for the storage of number pairs.

DETAILED DESCRIPTION

The system presented in FIG. 1 comprises a public telephone network 7, PSTN (Public Switched Telecommunications Network) and a number of telephone exchanges 9, PTX (Public Telephone Exchange) connected to it. In addition, the system comprises a mobile communications network 6, MCN (Mobile Communications Network), and a number of mobile services switching centres 10, MSC (Mobile Services Switching Centre) connected to it. An essential part of the system is an intelligent network 5, IN (Intelligent Network), which is connected to the public telephone network 7 and/or to the mobile communications network 6 e.g. via an interconnecting network. The intelligent network 5 comprises, e.g. in accordance with the CCITT definition (IN Conceptual Model) a service switching point 11, SSP (Service Switching Point), through which the intelligent network is connected to the public telephone network 7 PSTN or 6 MCN, a service control point 2 SCP (Service Control Point) which contains the logic associated with the control of the services, i.e. the service control functions, and which is usually also provided with a service database 1 SDF (Service Data Function) which contains information including the customer and network data needed for the services, a service management system 12 SMS (Service Management System) which contains the required functions for the creation and control of services, an intelligent peripheral device or peripheral computer 13.

The SSP 11 is functionally a part of a wired network or mobile communications network exchange or it is integrated with an exchange PTX 9 or MSC 10. When a caller makes a call to a common call number ABCDER, which constitutes an essential feature of the present invention, where R is an integer from the set [0, 1, . . . , N], the SSP 11 recognizes an IN need on the basis of the beginning or prefix part ABCDE of the called number and transmits an IN request to the other IN components. Moreover, the SSP 11 contains a service switching function SSF (Service Switching Function) and a function CCAF (Call Control Agent Function) associated with the control of the calling subscriber's selection. Functionally, the SCP 2 controls the implementation of IN services by issuing commands to other functions, including SSF, CCAF, SRF and SDF, as necessary for the service. The SMS 12 contains a service management point SMP (Service Management Point), a service creation point SCEP (Service Creation Environment Point), which also comprises a service creation function SCEF (Service Creation Environment Function) for the definition, development and testing of services, and a service management function SMF (Service Management Function) which is used to control the supply and implementation of services. The intelligent peripheral device or computer IP 13 contains special auxiliary functions SRF (Special Resource Function) used to implement e.g. voice announcements, voice recognition and speech processing.

In the following, the invention is described by the aid of a preferred embodiment by referring to FIG. 1. In this embodiment, the calling master subscription is a wired network 7 subscription and the receiving slave subscription is a mobile communications network 6 subscription and vice versa.

Referring to FIG. 1, the wired network subscription and the terminal 14 connected to it communicates via a wired connection with a public telephone exchange PTX 9, which transmits the calls in the wired network PSTN 7 and further to other telecommunications networks and vice versa. Further, via a base station 16 with a limited base station area and via a mobile communications network MCN 6, the mobile station 15 usually communicates with a mobile communications switching centre MSC 10, which transmits the calls in the mobile communications network MCN and further to other telecommunications networks and vice versa.

When a caller dials a number in the wired telephone network 7, the subscriber number or identity or A-ID of the calling subscription is fed into the telephone network, on the basis of which information the calling subscription can be unambiguously determined. In a mobile communications network 7, e.g. an authentication centre (AUC or AR), a home location register HLR (Home Location Register) or a visitor location register VLR (Visitor Location Register) identifies the caller or calling subscriber, and, together with the calling subscriber's subscriber number and the dialled number, unambiguous identification data, such as the international mobile subscriber identity IMSI, which consists of the mobile subscriber's national mobile subscriber identity NMSI and the mobile country code MCC, is fed into the mobile communications network. Moreover, the information fed into the network comprises the mobile subscriber identification number MSIN, by means of which the mobile subscriber can be identified within the area of the mobile communications network, the temporary mobile subscriber identity TMSI, which is a temporary identifier assigned to the mobile subscriber by the visitor location register to allow identification of the subscriber, and the international mobile station equipment identity to allow identification of the mobile station. The calling subscriber number and the identification data for the calling subscriber and/or the calling subscriber's mobile station constitute the calling subscriber identity or A-ID.

In this connection it is to be noted that the creation of invoicing records and their input to the invoicing system 8 is usually handled by the telephone exchanges PTX 9 or MSC 10, and when an intelligent network (IN) architecture is used, the selections given, especially selections requiring IN support, are routed via one or more intelligent network service switching points 11, to one of which the telephone exchanges PTX or MSC are connected. It is also to be noted that there is nothing to prevent the telephone exchanges PTX 9 or MSC 10 of all or at least the digital communication systems from being used as service switching points SSP 11. Furthermore, an SSP 11 may also function in a telephone network as a router to systems connected to or communicating with the telephone network, such as a customer service system or CSS, which is usually implemented as a voice service computer CVAP (Central Voice Application Platform), (not shown).

To join a system according to the invention as a user, the subscriber dials the service number of the system via the terminal equipment he/she wants to include in the system. When this is done, the system according to the invention is supplied with the calling subscriber identity data or A-ID, which is stored in a first database SDF 3 in the SCP 2 or in a database equipment 1 capable of data communication with it. This database SDF 3 therefore contains the A-ID information for all subscriptions that have joined the system.

In response to the calling subscriber identity information, a customer- and/or calling subscription-specific file or register corresponding to the A-ID as shown in FIG. 3 is created in a second database DB 4 in the SCP 2 or in the database equipment 1 communicating with it. Preferably the customer-specific subscriber numbers are stored in this file or register in the form of a table. Further, FIG. 3 shows a subscriber number pair 123456 and 333444 defined as numbers corresponding to each other and 020100 as the common call number for this number pair. In a corresponding manner, both numbers can be assigned further paired numbers by entering the desired numbers into the 0-fields in the table.

The numbers stored in the customer-specific file or register are those subscriber numbers that are intended to form a pair or set of numbers for specially rated calls, which means that in addition to the master subscriber number at least one slave subscriber number is stored in the register. When the number of subscriptions stored is two, the common call number for calls from any one of the subscriptions in the pair to the other subscription in the pair is always the same and preferably of the format ABCDE0, in which case either the dialled number as a whole or its prefix part ABCDE will activate the intelligent network control and the last digit 0 of the dialled number together with the A-ID given into the network will function as an inquiry key and activate a search to find the second number of the pair in the second database DB 4 in the database equipment 1 and further under control of the intelligent network 5 cause the call to be connected via the SSP 11 to the subscription corresponding to the second subscriber number while at the same the invoicing system 8 is supplied with invoicing data for the specially rated call.

When the number of customer-specific or small-enterprise-specific subscriptions is more than two, the common call number is of the format ABCDER, where R is an integer and dependent on the number of subscriptions to be combined. The prefix part ABCDE of the selection will activate the intelligent network control 5 and the last selection R together with the A-ID given into the network will function as an inquiry key and activate a number search to find the second number of the pair in the second database DB 4 in the database hardware and further under control of the intelligent network 5 cause the call to be connected via the SSP 11 to the relevant subscription while at the same the invoicing system 8 is supplied with invoicing data for the specially rated call.

After the user A-ID has been stored in the first database SDF 3 and after the desired subscriber numbers have been stored in the customer- and/or calling-subscriber-specific register or file in the second database DB 4, in which second database 4 and register the A-ID together with the common call number functions as a search key, the system of the invention is ready for use. When the user calls the predetermined common call number via the network exchange PTX 9 or MSC 10, the user is identified automatically by the telephone network exchange. The communication system takes care of the signalling associated with the call. In the case of a call between an intelligent network (IN) exchange 5 and a PTX 9 or MSC 10 exchange, the signalling follows a protocol consistent with e.g. the SS7, TUP, ISUP, TCP/IP, X400, X500, X25 or similar standard.

Referring to FIG. 2, further preferred possibilities of application of the invention are now described. A call to the common call number is directed from the telephone network of the subscriber exchange, either a wired network 7 telephone exchange 9 or a mobile communications network 6 exchange 10, to which the subscription is connected, either using the dialled number directly or using an intermediate number to be assigned during the call setup, to an intelligent network 5, which is connected either to the wired network $5^1$, alternative A, or to a mobile communications network $5^2$, alternative B. The intermediate number may be a prefix added before the selection given from the calling subscription or the selection may be replaced with a different number. Further, in the intelligent network element performing the service, the service can be identified either directly by the selection given or by the calling subscriber's identity. Moreover, the service can be so implemented that, when the call is made from a wired network, the intelligent network $5^1$ connected to the wired network 7 is used, and correspondingly when the call is made from a mobile communications network, the intelligent network $5^2$ connected to the mobile communications network 6 is used.

The invention is not limited to the embodiment examples presented above, but many variations are possible within the framework of the inventive idea defined by the claims.

What is claimed is:

1. Procedure for the setting up of calls in a telephone network between a first and a second subscription, in which method:
   a common call number differing from the subscriber number is reserved for all subscriptions, and
   a specially priced call is set up between two predetermined subscriptions, characterized in that
      a pair of subscriber numbers between the first and the second subscriber number is established, in which the second subscriber number corresponds to the first subscriber number and the first subscriber number corresponds to the second subscriber number and between which a call is set up upon selection of the common call number,
      and the pair of numbers is stored by means of a checking device;
   a call made to the common call number by the first or second subscription is directed to a checking device; and
   the called subscriber number is determined in the checking device on the basis of the subscriber number of the calling subscription;
   the call is connected to the subscription corresponding to the calling subscriber number; and
   invoicing data determined on the basis of the common call number is supplied into an invoicing system.

2. Procedure as defined in claim 1, characterized in that the common call number consists of two parts, comprising a prefix part and a suffix part, on the basis of which the pair of subscriber numbers to be considered is selected.

3. Procedure as defined in claim 1, characterized in that the subscriber numbers entitled to calls set up by means of a common call number are stored to a database and the calling subscriber's right to calls set up by means of a common call number is verified by reference to the database.

4. Procedure as defined in claim 1, characterized in that the pair of subscriber numbers is formed between a wired network subscriber number and a mobile communication network subscriber number.

5. Procedure as defined in claim 1, characterized in that the pair of subscriber numbers is established between a wired network subscriber number and a plurality of mobile communication network subscriptions; the pair of subscriber numbers is so defined that a call made from the wired network subscriber number is directed on the basis of the suffix part of the common call number to the subscription corresponding to the mobile subscriber number defined in the pair of subscriber numbers, and a call made from each mobile subscriber number is directed to the subscriber number corresponding to the wired network subscriber number defined in the pair of subscriber numbers.

6. Procedure as defined in claim 1, characterized in the pair of subscriber numbers is established among a set comprising a wired network subscriber number and a plurality of mobile network subscriber numbers so that a call made from any one of the subscriber numbers to the common call number is directed on the basis of the suffix part of the common call number to the subscription corresponding to the second subscriber number corresponding to the calling subscriber number in the set of subscriber numbers.

7. Procedure as defined in claim 1, characterized in that the pair of subscriber numbers is established between two subscriber numbers in a wired network and/or a mobile communication network.

8. Procedure as defined in claim 1, characterized in that the pairs of subscriber numbers are stored in the form of a table.

9. System for the setting up of a call in a telephone network between a first and a second subscription, characterized in that the system comprises a storage device (1) for the storage of the pair of numbers between the first and the second subscriber number, in which the second subscriber number corresponds to the first subscriber number and the first subscriber number corresponds to the second subscriber number and between which a call is set up upon selection of the common call number;

means (2) for receiving the subscriber number of the calling subscription in connection with the setup of a call made to the common call number and for determining the called subscriber number corresponding to the subscriber number on the basis of the data of the pair of subscriber numbers stored on the storage device; and an invoicing system (8) which is connected to the telephone exchange and/or to the intelligent network switching centre (5) and in which the invoicing is based on invoicing data related to the common call number.

10. System as defined in claim 9, characterized in that the storage device (1) comprises a first database (3) for the storage of subscriber numbers entitled to calls set up by means of a common call number; and a second database (4) for the storage of pairs of subscriber numbers in the form of a table between which a call is to be set up when the common call number is called.

11. System as defined in claim 9, characterized in that the telephone network comprises an intelligent network switching centre (5); and that the storage device (1) and the means (2) for receiving the subscriber number of the calling subscription and determining the pair of subscriber numbers corresponding to the subscriber number are disposed in the intelligent network switching centre.

12. System as defined in claim 9, characterized in that the telephone network comprises a mobile communication network (6) and/or a wired telephone network (7).

13. System as defined in claim 12, characterized in that the intelligent network switching centre (5) is disposed in the mobile communication network (6); and that a call to the common call number is directed to the intelligent network switching centre of the mobile communication network.

14. System as defined in claim 12, characterized in that the intelligent network switching centre (5) is disposed in the wired telephone network (7); and that a call to the common call number is directed to the intelligent network switching centre of the wired telephone network.

15. System as defined in claim 9, characterized in that one of the databases contains a number of common call numbers and the pair of subscriber numbers corresponding to each common call number so that the first subscriber number in each of the pair of subscriber numbers is the same wired network subscriber number and the second subscriber number is a mobile communication network subscriber number.

16. System as defined in claim 9, characterized in that one of the databases contains a number of common call numbers and the pair of subscriber numbers corresponding to each common call number so that the first and second subscriber numbers in each pair of subscriber numbers are selected from a set of subscriber numbers comprising a wired network subscriber number and/or a mobile communication network subscriber number.

* * * * *